(12) United States Patent
Sylvester et al.

(10) Patent No.: US 12,262,694 B1
(45) Date of Patent: Apr. 1, 2025

(54) TELESCOPIC PET WASTE CATCHER WITH INTEGRATED BAG DISPENSER AND ELECTRIC SYSTEM

(71) Applicants: Georgena Sylvester, Brooklyn, NY (US); Tesfa Francis, Brooklyn, NY (US)

(72) Inventors: Georgena Sylvester, Brooklyn, NY (US); Tesfa Francis, Brooklyn, NY (US)

(*) Notice: Subject to any disclaimer, the term of this patent is extended or adjusted under 35 U.S.C. 154(b) by 485 days.

(21) Appl. No.: 17/719,535

(22) Filed: Apr. 13, 2022

(51) Int. Cl.
*A01K 23/00* (2006.01)

(52) U.S. Cl.
CPC .................................. *A01K 23/005* (2013.01)

(58) Field of Classification Search
CPC ............... A01K 23/005; E01H 1/1206; E01H 2001/1266; E01H 2001/1206
USPC .................................................. 294/1.3, 1.5
See application file for complete search history.

(56) References Cited

U.S. PATENT DOCUMENTS

| | | | | |
|---|---|---|---|---|
| 5,442,970 A * | 8/1995 | Hutchins | .................. | G01N 1/12 |
| | | | | 73/864.63 |
| 8,177,270 B2 * | 5/2012 | Chen | ..................... | A01K 23/005 |
| | | | | 294/1.4 |
| D729,929 S * | 5/2015 | McBride | ..................... | D24/108 |
| 10,405,523 B1 * | 9/2019 | Cooke | .................. | A01K 23/005 |
| 10,465,351 B1 * | 11/2019 | Perez | ..................... | E01H 1/1206 |
| 10,772,300 B1 | 9/2020 | Hicks | | |
| 11,096,377 B1 | 8/2021 | Rogers | | |
| 11,118,320 B2 * | 9/2021 | Patterson | ............. | H05B 3/0014 |
| 11,221,278 B2 * | 1/2022 | Briseno | .................... | G01N 1/20 |
| 2007/0065339 A1 * | 3/2007 | Huff | ..................... | G01N 33/493 |
| | | | | 422/400 |
| 2007/0176444 A1 * | 8/2007 | Pilas | ..................... | A01K 23/005 |
| | | | | 294/1.5 |
| 2011/0071434 A1 * | 3/2011 | Higgins | ............... | A61B 10/007 |
| | | | | 600/573 |
| 2015/0297194 A1 * | 10/2015 | Meloff | ................. | A61B 10/007 |
| | | | | 600/573 |

* cited by examiner

*Primary Examiner* — Paul T Chin
(74) *Attorney, Agent, or Firm* — Sanchelima & Associates, P.A.; Jesus Sanchelima; Christian Sanchelima

(57) ABSTRACT

A pet waste catcher including a handle assembly with a bag container cup assembly and, a dispensing base assembly and an electric system assembly. The handle assembly includes a handle that has a telescopic body. The container assembly includes a container mounted to a second ending of the handle which comprises an external threaded portion at a bottom portion of the container and an outlet is placed in an internal face of the container to pull disposable bags thereof. The dispenser assembly includes a dispenser which has an internal threaded portion to screw to the bottom of the external threaded portion of the container and store disposable bags that are pulled out thought the inlet of the dispenser to wrap the dispenser and catch pet waste. Electric system assembly includes an electric system mounted proximal to a first distal end of the handle assembly.

14 Claims, 4 Drawing Sheets

US 12,262,694 B1

TELESCOPIC PET WASTE CATCHER WITH INTEGRATED BAG DISPENSER AND ELECTRIC SYSTEM

II. BACKGROUND OF THE INVENTION

1. Field of the Invention

The present invention relates to a pet waste catcher and, more particularly, to a pet waste catcher that includes an extended handle with a cup-shaped bag supporter with a dispensing base both located at a distal ending to collect and discard waste through dispensing bags wrapped on the bag supporter.

2. Description of the Related Art

Several designs for have been designed in the past. None of them, however, include a pet waste catcher with a cup-shaped bag supporter wherein a disposable bag is wrapped over the bag supporter and can be used as a container to collect and dispose of pet waste.

Applicant believes that a related reference corresponds to U.S. Pat. No. 10,772,300 issued for a pet waste catcher having an extendable handle with a bag holding hoop at the end having a bag dispenser attached. Applicant believes that another related reference corresponds to U.S. Pat. No. 11,096,377 issued for a pet waste collection apparatus with a telescopic handle and an adjustable pet waste scoop that supports a bag. None of these references, however, teach of a pet waste catcher comprising a telescopic handle with a collapsible cup-shaped bag supported at the distal end, wherein the bag supporter includes a bag container/dispenser which threadably attaches to the bottom of the bag supporter cup such that a bag may be pulled up from the bottom and wraps over the top edges of the cup-shaped bag supporter.

Other documents describing the closest subject matter provide for a number of more or less complicated features that fail to solve the problem in an efficient and economical way. None of these patents suggest the novel features of the present invention.

III. Summary of the Invention

It is one of the objects of the present invention to provide a pet waste container that includes a telescopic handle to catch pet waste to prevent bending and handling pet waste.

It is another object of this invention to provide a pet waste container that includes a dispenser base located on a bottom of the cup-shaped supporter for disposing of pet waste repeatedly.

It is still another object of the present invention to provide a pet waste container that includes a light device and an alarm device attached to the extension of the telescopic handle allowing the user to use the invention at night to increase comfort and safety.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

Figure 1:
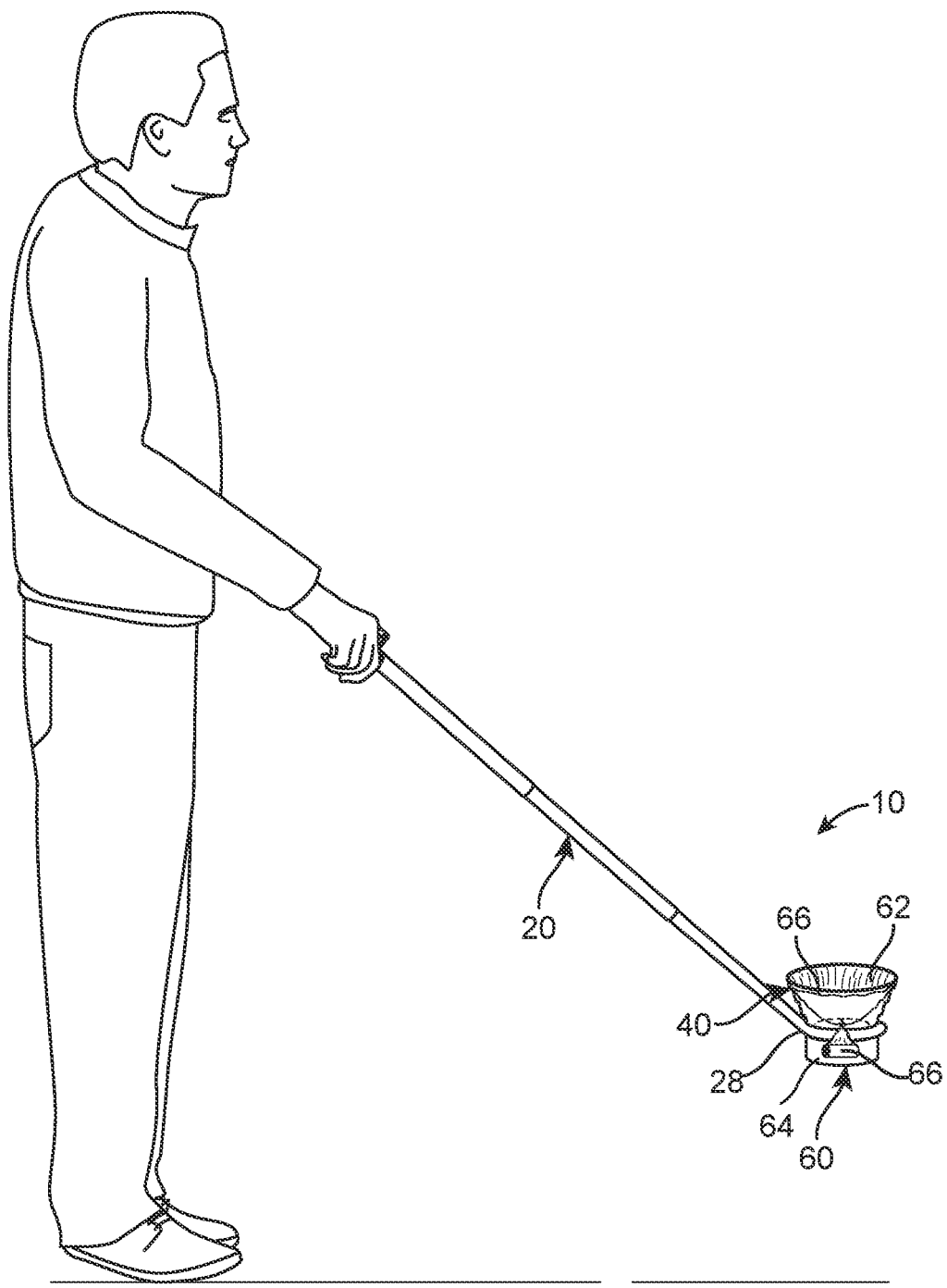

With the above and other related objects in view, the invention consists in the details of construction and combination of parts as will be more fully understood from the following description, when read in conjunction with the accompanying drawings in which:

FIG. 1 represents an operational view of the present invention 10 wherein a user is holding the handle assembly 20. Container assembly 40 includes a dispenser assembly 60 screwed to the bottom of the container 62 with disposable bags 66 wrapped into the internal inside of the container 62.

Figure 2:
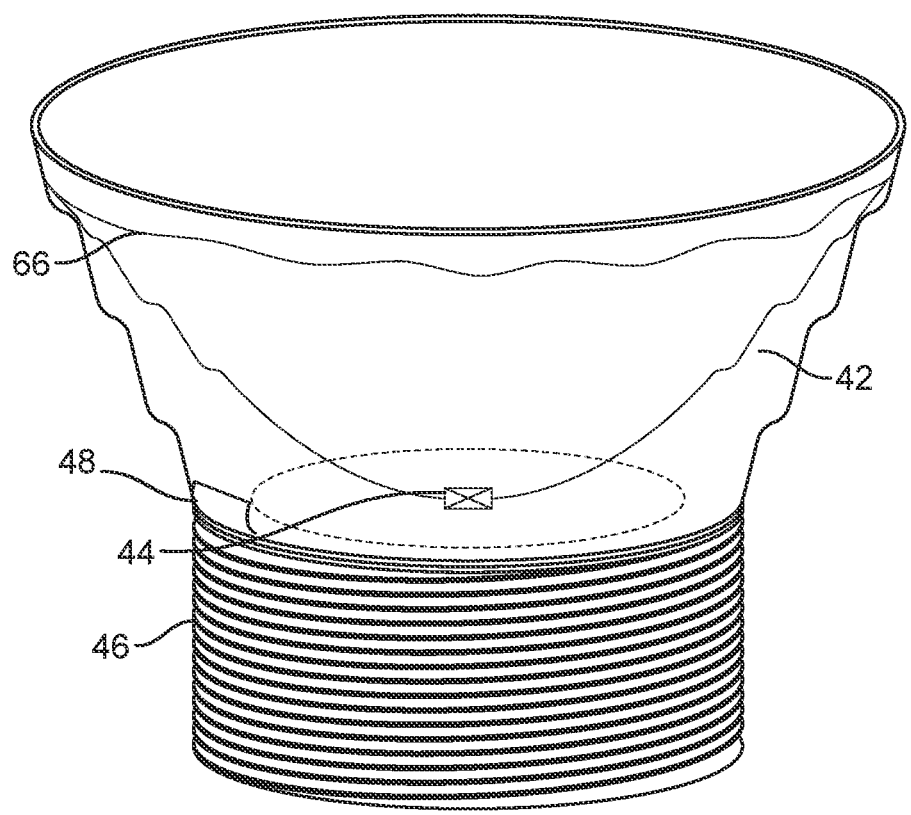

FIG. 2 illustrates front perspective internal view of the container 42. Container 42 has an external threaded portion 46 located at a bottom of the container 42. An outlet 44 for the disposable bags 66 is located inside at a center of container 42. An attachable portion 48 is located at a top of external threaded portion 46.

Figure 3:
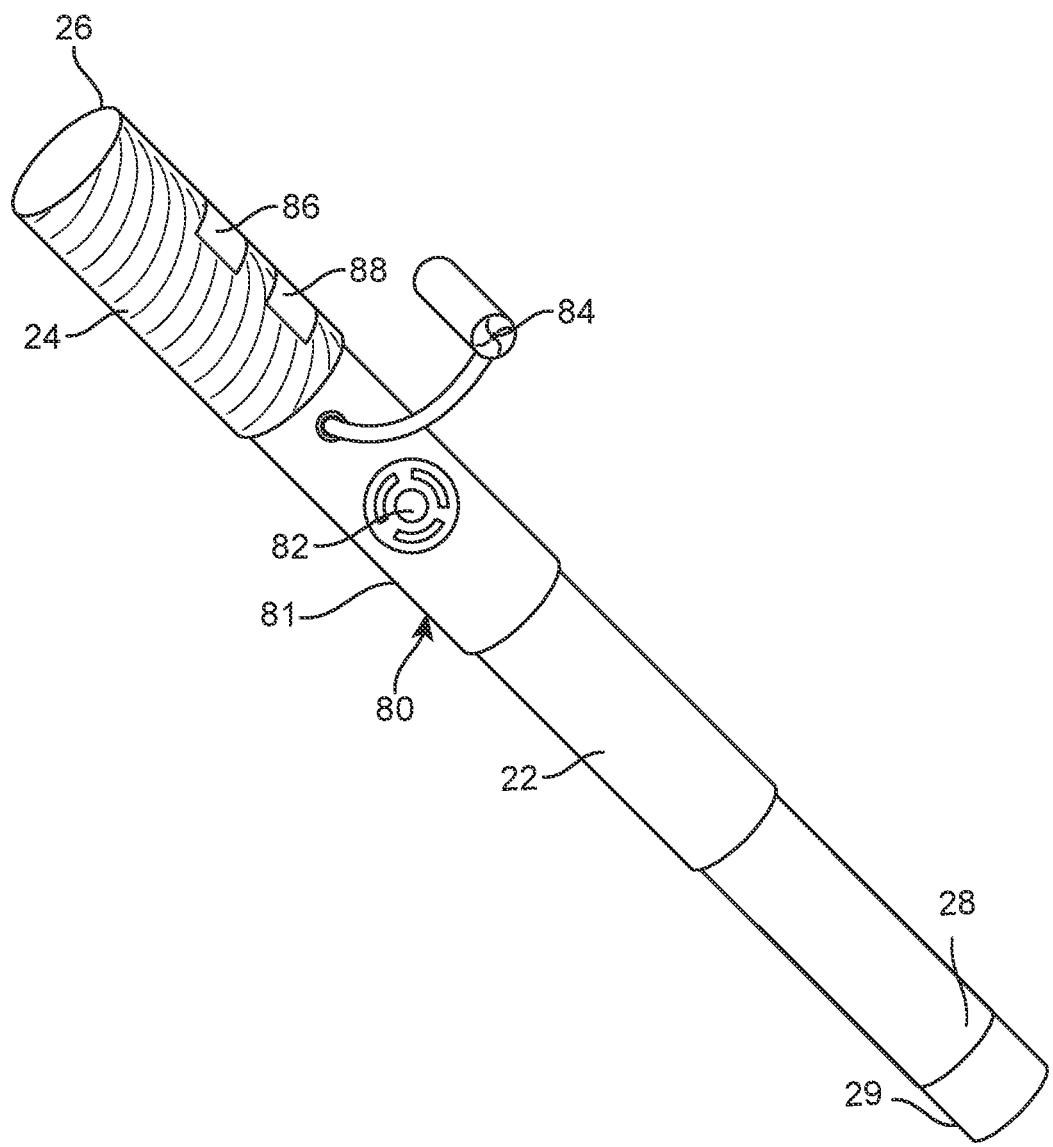

FIG. 3 shows a perspective view of the handle 22. Handle 22 has a telescopic extended body including an electric system assembly 80 mounted proximal to a gripping portion 24 with a first bottom 26 and a second bottom 28 attached to the gripping portion 24 with a flashlight 84 and an alarm 86 attached proximally to the first distal end 26. A holding portion 29 is located at a second distal end 28.

Figure 4:
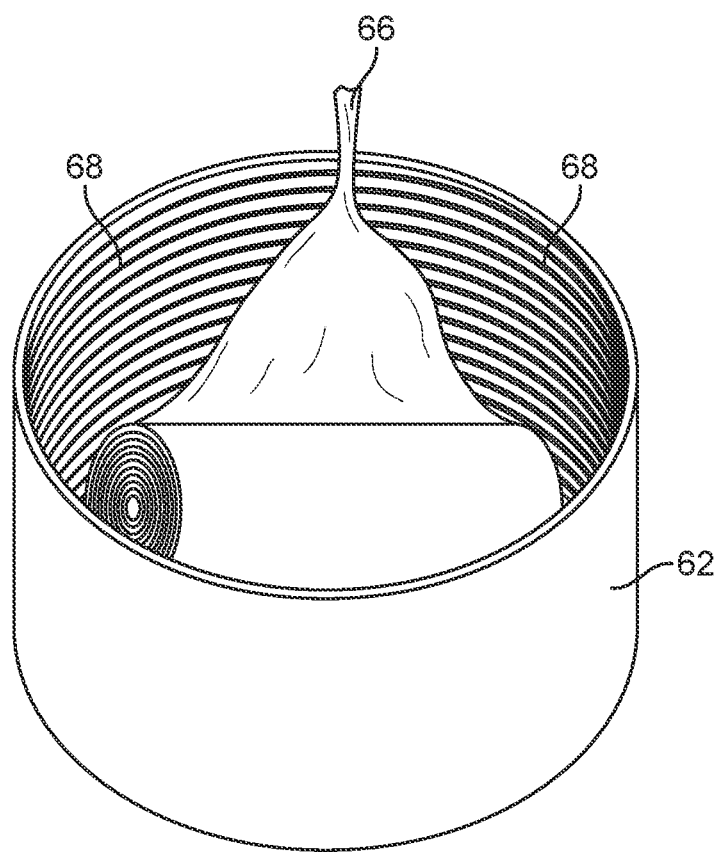

FIG. 4 is a representation of the dispenser 62. Please provide a drawing where the dispenser 62 has cylindrical and hollow body and with an internal threaded portion 68 with disposable bags 66 stored in the dispenser 62.

V. DETAILED DESCRIPTION OF THE EMBODIMENTS OF THE INVENTION

Referring now to the drawings, where the present invention is generally referred to with numeral 10, it can be observed that it basically includes a handle assembly 20, a container assembly 40, a dispenser assembly 60 and an electric system assembly 80. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The handle assembly 20 includes a handle 22, said handle includes a gripping portion 24, a plurality of distal ends including a first distal end 26 and a second distal end 28, and a holding portion 29. In a preferred embodiment, handle 22 may have a telescopic body to allow handle 22 extend and contract as needed. Nevertheless, in different embodiments handle 22 may have a rectangular body, tube body, cone body, cylinder body or the like. It is to be understood handle 22 may be located such as is attached to container assembly 40 and dispenser assembly 60 through a first distal end 26 or a second distal end 28. Handle 22 may be made of a rigid material to allow to withstand external components attached to handle 22. Nevertheless, in alternative embodiments handle 22 may be made of a flexible material, stretchable material, malleable material, rubber material or any variation thereof. Handle 22 may include a gripping portion 24 located at a first distal end 26 of the plurality of distal ends of the handle 24. Nevertheless, gripping portion 24 may be located at a second distal end 28 of the plurality of distal ends of the handle 22. Gripping portion 24 may be made of a rigid rubber material allowing to have a better grip. Nevertheless, gripping portion 24 may be made of a plastic material, wood material, ceramic material, steel material or the like. Gripping portion 24 may have a circular shape as handle 22 may have circular shape. In different embodiments, gripping portion 24 may have a square shape, triangular shape, hexagon shape, or any variation thereof. First distal end 26 may have a circular shape. However, in a different embodiment, first distal end 26 may have a square shape, a triangular shape, a hexagon shape, a star shape or any variation thereof. It is to be understood that first distal end 26 may be made of a rigid material as handle 26. In a suitable embodiment handle 22 may include a plurality of distal ends. A first distal end 26 of the plurality of distal ends may be located at a start of the body of the handle 22. Nevertheless, in a different embodiment first distal end 26 may be located at an end of the body of the handle 22. First distal end 26 may have a circular shape. However, in a different embodiment, first distal end 26 may have a square shape, a triangular shape, a hexagon shape, a star shape or any variation thereof. It is to be understood that first distal end 26 may be made of a rigid material as handle 26 may have a rigid material. A second distal end 26 of the plurality of distal ends may be located at an end of the body of the handle 22. Nevertheless, in a different embodiment second distal end 28 may be located at a start of the body of the handle 22. Second distal end 28 may have a circular shape. However, in a different embodiment, first distal end 28 may have a square shape, a triangular shape, a hexagon shape, a star shape or any variation thereof. It is to be understood that distal end 28 may be made of a rigid material as handle 22 may have a rigid material. In a suitable embodiment, handle 22 may include a holding portion 29 located on a second distal end 28 of the plurality of distal ends of the handle 22. Nevertheless, in alternative embodiments, handle 22 may include a holding portion 29 located at a first distal end 26 of the plurality of distal ends of the handle 22. As shown in FIG. 4 holding portion 29 may be made of a magnetite material to permit to attach hold a container assembly 40 through an attachable portion 46 of container assembly 40. However, in different embodiments, holding portion 29 may be made of a plastic material, rubber material, iron material or the like. It is to be understood that holding portion 29 may have a protruded square body to be attached to the container assembly 40. Nevertheless, holding portion 29 may have a protruded circular body, a protruded triangular body, a protruded hexagon body or any variation thereof.

The container assembly 40 may include a container 42, an outlet 44, an external threaded portion 46 and an attachable portion 48. It should be considered that container 42 may be attached to the handle 22 through the holding portion 29. In a preferred embodiment, container 42 may have a hollow cup-shaped body to allow to support disposable bags 66 therein. Nevertheless, container 42 may have a hollow cylinder body, a hollow triangular body, a hollow square body, a hollow hexagon body or any variation thereof. Container 42 may be suitable to be made of a rigid plastic. In a suitable embodiment container 42 may include an outlet placed in a center of an internal base as shown in FIG. 2. However, outlet 44 may be placed in a different internal part of the container 42. It is to be considered that outlet 44 may be an aperture for the dispenser assembly 60 to pull the disposable bags 66 allowing to set disposable bags over container 42. In one embodiment outlet 44 may have a cross shaped opening to allow the outlet of the disposable bags 66 of dispenser assembly 60. However, in alternative embodiments, outlet 44 may have a square shape, triangular shape, circle shape or the like. Outlet 44 may be suitable to be made of a plastic material as container 42 may be made of. Container 42 may include an external threated portion 46 located on a bottom outline of the container 42. Nevertheless, in a different embodiment, external threated portion 46 may be located on a top outline of the container 42. In one embodiment, external threaded portion 46 may be made of a steel material. External threaded portion 46 may have a standard thread as shown in FIG. 2. Nevertheless, external threaded portion 46 may have a square thread, a buttress thread a metric, a metric thread, or any variation thereof. It should be considered that external threaded portion 46 may be suitable to screw with an internal threaded portion 68 of the dispenser assembly 60. Container 42 may have an attachable portion 48 to allow attach handle 22 on the second distal end 28 through the holding portion 29. In a preferred embodiment attachable portion 48 may be placed above the external threaded portion 46 of the container 42. Nevertheless, in alternative embodiments, attachable portion 48 may be placed below the external threaded portion 46. In a suitable embodiment, attachable portion 48 may be made of a magnetite material to allow to connect the holding portion 29 of handle 22. Nevertheless, in an alternative embodiment, attachable portion 29 may be made of a plastic material, steel material, rubber material, or the like.

There is another embodiment that may complement the container assembly 40 through the external threaded portion 46. Dispenser assembly 60 may be a complement of container assembly 40. Dispenser assembly 40 may include a dispenser 62, a reservoir 64, disposable bags 66 and an internal threaded portion 68. It is to be considered that dispenser 62 may have a circular shape as bottom of the container assembly 40 may have a cylindric body, as shown in FIG. 4. In a different embodiment, dispenser 62 may have a hexagonal prism, triangular prism, octagonal prism, or any variation thereof. In an embodiment, dispenser 62 may be made of a rigid plastic material. However, dispenser 62 may be made of a polyethylene material, a polypropylene material, rigid rubber material or the like. As best observed in FIG. 4, container 62 may include a reservoir 64. In a suitable embodiment reservoir 64 may entirely cover the hollow body of dispenser 62. Nevertheless, reservoir 64 may cover a half section, third section, quarter section or any variation thereof. Reservoir 64 may be suitable to store disposable bags 66 therein. In a preferred embodiment, reservoir 64 may be made of a rigid plastic material as dispenser 62 may be made of a rigid plastic material to allow to store disposable bags 66. Reservoir 64 may have a cylinder body to fit in the dispenser 62. Nevertheless, in another embodiment reservoir 64 may have a rectangular prism, triangular prism, hexagonal prism, or the like. Dispenser 62 may include an internal threaded portion 68. Internal threaded portion 68 may cover the internal outline of the dispenser 62. In a suitable embodiment internal threaded portion 68 may screw the external threaded portion 46 of container assembly 68. Internal threaded portion 68 may have a standard thread as shown in FIG. 4. Nevertheless, external threaded portion 46 may have a square thread, a buttress thread, a metric thread or any variation thereof. Internal threaded portion 68 may be made of a steel material as external threaded portion 46 may be made of a steel material to allow to connect in a suitable embodiment both internal threaded portion 68 and external threaded portion 46. Disposable bags 66 may be located inside the dispenser 62 and may connect with the container 42 through the outlet 44 of the container 42. Disposable bags 66 may be configured in a roller such that a single disposable bag can be pulled and unroll next disposable bag. Disposable bags 66 may be opened and supported on the edges of the container 40 to permit disposal of waste pet.

An electric system assembly 80 may include an electric system 81. In a suitable embodiment electric system 81 may be places on a first distal end of the plurality of distal ends of the handle 22. In one embodiment, electric system 81 may be made of a plastic material. Nevertheless, electric system 81 may be made of a steel material, rubber material, ceramic material, aluminum material or the like. Electric system 81 may have a hollow cylindrical body to fit in the handle 22. In another embodiment, electric system 81 may have a hollow triangular prism body, a hollow rectangular prism body, a hollow hexagonal prism body or any variation thereof. Electric system 81 may include an alarm 82, a light 84, a plurality of buttons having a first button 86 and a second button 88 to activate the electric system allowing to have a panic button and a flashlight for dark places. Alarm 82 may be placed on a first distal end of the plurality of distal ends mounted on the gripping portion 24 of the handle 22. Alarm 82 may be of a rigid plastic material. As shown in FIG. 3 alarm 82 may be placed at a center portion of the electric system 81. However, in a different embodiment, alarm 82 may be placed on a bottom portion, top portion, rear portion, or the like. Alarm 82 may have a circle shape. Nevertheless, alarm 82 may have a square shape, a triangular shape, a rectangular shape, a hexagon shape, a pentagonal shape, or any variation thereof. Flashlight 84 may have an extended body as shown in FIG. 3. In a suitable embodiment light 84 may be located next to the alarm 82. However, light may be located with a differential distance from the alarm 82. Flashlight 84 may be made of a rigid material. It is to be understood that at least one of the plurality of buttons is configured to activate either the alarm 82 or the light 84. In a suitable embodiment, first button 86 of the plurality of buttons of electric system 81 may activate the alarm 82. Nevertheless, first button 86 may activate the flashlight 88. First button 86 may have a square shape as shown in FIG. 3. However, first button 86 may have a circular shape, a triangular shape, a hexagonal shape or the like. In a suitable embodiment, second button 88 of the plurality of buttons of electric system 81 may activate the flashlight. Nevertheless, second button 86 may activate the alarm 82. In one embodiment, second button 88 may be made of a rubber material. Nevertheless, in alternatives embodiments, second button 88 may be made of a steel material, ceramic material, plastic material, or the like. Second button 88 may be placed on the gripping portion 24 of the handle 22.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A pet waste catcher comprising:
   a handle assembly including a handle with a telescopic body which is capable of being extended and contracted, said telescopic handle includes a first and a second distal end;
   a container assembly including a container, said container is attached to said handle, said container includes an external threaded portion located at a bottom of said container;
   a dispenser assembly including a dispenser, said dispenser includes a reservoir to permit the storage of disposable bags, said dispenser includes an internal threaded portion located on an internal contour of said dispenser, said internal threated portion of said dispenser screws said external threaded portion of said container; and
   an electric system assembly including an electric system, said electric system is mounted on said handle assembly.

2. The pet waste catcher of claim 1, wherein said handle includes a gripping portion located to at least one of the distal ends of said handle allowing to grab said handle.

3. The pet waste catcher of claim 1, wherein said handle includes a holding portion located to at least one of the distal ends of said handle allowing to attach said container.

4. The pet waste catcher of claim 1, wherein said container includes an outlet located at an internal center of said container.

5. The pet waste catcher of claim 1, wherein said container includes an attachable portion located at a top of said external threaded portion.

6. The pet waste catcher of claim 1, wherein said dispenser includes an internal threaded portion located on an internal contour of said dispenser.

7. The pet waste catcher of claim 1, wherein said electric systems includes an alarm and a flashlight connected to said electric system.

8. The pet waste catcher of claim 7, wherein said alarm is controlled by at least one of the plurality of buttons and said flashlight is controlled by at least one of the plurality of buttons.

9. A pet waste catcher, comprising:
   a handle assembly including a handle with a telescopic body which is capable of being extended and contracted, said telescopic handle includes a first and a second distal end, said handle includes a gripping portion located to at least one of the distal ends of said handle allowing to grab said handle, said handle includes a holding portion located to at least one of the distal ends of said handle allowing to attach a container;
   a container assembly including said container, said container is attached to said handle, said container includes an external threaded portion located at a bottom of said container, said container includes an outlet located at an internal center of said container, said container includes an attachable portion located at a top of said external threaded portion;
   a dispenser assembly including a dispenser, said dispenser includes a reservoir to permit the storage of disposable bags, said dispenser includes an internal threaded portion located on an internal contour of said dispenser, said internal threated portion of said dispenser screws said external threaded portion of said container; and
   an electric system assembly including an electric system, said electric system is mounted on said handle assembly, said electric systems includes an alarm and a flashlight attached to said electric system, said alarm is controlled by at least one of the plurality of buttons and said flashlight is controlled by at least one of the plurality of buttons.

10. The pet waste catcher of claim 9, wherein said gripping portion is located at a first distal end of said handle to allow a better grip to the user and said holding portion is located at a second distal end of said handle to allow fastening said container.

11. The pet waste catcher of claim 9, wherein said outlet is configured for pull disposable bags thereof and cover said container with opened disposable bags pulled out from said dispenser.

12. The pet waste catcher of claim 9, wherein said internal threaded portion of said dispenser screws said external threaded portion of said container.

13. The pet waste catcher of claim 9, wherein said alarm is activated by a first button and said flashlight is activated by a second button allowing a better security to the user, said first button, and said second button are attached to said gripping portion.

14. A pet waste catcher, consisting of:
- a handle assembly including a handle with a telescopic body which is capable of being extended and contracted, said telescopic handle includes a first and a second distal end, said gripping portion is located at a first distal end of said handle and said holding portion is located at a second distal end of said handle to allow fastening said container;
- a container assembly including a container, said container is attached to said handle, said container includes an external threaded portion located at a bottom of said container, said container includes an outlet located at an internal center of said container, said outlet is configured for pull disposable bags thereof and cover said container with opened disposable bags pulled out from said dispenser, said container includes an attachable portion located at a top of said external threaded portion;
- a dispenser assembly including a dispenser, said dispenser includes a reservoir to permit the storage of disposable bags, said dispenser includes an internal threaded portion located on an internal contour of said dispenser, said internal threated portion of said dispenser screws said external threaded portion of said container; and
- an electric system assembly including an electric system, said electric system is mounted on said handle assembly, said electric systems includes an alarm and a flashlight attached to said electric system, said alarm is activated by a first button and said flashlight is activated by a second button allowing a better security to the user, said first button, and said second button are attached to said gripping portion.

* * * * *